| United States Patent [19] | [11] Patent Number: 4,559,156 |
|---|---|
| Greaves et al. | [45] Date of Patent: Dec. 17, 1985 |

[54] PROCESS FOR DISPERSING PARTICULATE MATERIAL IN AQUEOUS SYSTEMS

[75] Inventors: Brian Greaves; Paul Ingham, both of Runcorn, England

[73] Assignee: Dearborn Chemicals, Ltd., Widnes, England

[21] Appl. No.: 631,095

[22] Filed: Jul. 16, 1984

Related U.S. Application Data

[63] Continuation of Ser. No. 263,317, May 13, 1981, abandoned.

[30] Foreign Application Priority Data

Nov. 18, 1980 [GB] United Kingdom ............... 8036932

[51] Int. Cl.$^4$ ............................................... C02F 5/10
[52] U.S. Cl. ..................................... 252/82; 252/175; 252/180; 210/696; 210/701
[58] Field of Search ........... 252/175, 180, 82, DIG. 2, 252/174.23, 174.24; 210/696, 701

[56] References Cited

U.S. PATENT DOCUMENTS

| 3,463,730 | 8/1969 | Booth et al. | 252/180 |
|---|---|---|---|
| 3,549,548 | 12/1970 | Newman | 252/82 |
| 3,663,448 | 5/1972 | Ralston | 252/180 |
| 3,806,367 | 4/1974 | Lange et al. | 210/701 |
| 4,072,607 | 2/1978 | Schiller et al. | 252/180 |
| 4,147,627 | 4/1979 | Goodman | 252/180 |
| 4,164,521 | 8/1979 | Goodman | 252/180 |
| 4,175,100 | 11/1979 | Schiller et al. | 252/175 |

FOREIGN PATENT DOCUMENTS

| 848400 | 8/1970 | Canada . |
|---|---|---|
| 863295 | 2/1971 | Canada . |
| 2061249 | 5/1981 | United Kingdom . |
| 298540 | 5/1974 | U.S.S.R. . |
| 0768765 | 10/1980 | U.S.S.R. . |

*Primary Examiner*—Paul Lieberman
*Assistant Examiner*—Hoa Van Le
*Attorney, Agent, or Firm*—Mark T. Collins; William W. McDowell, Jr.

[57] ABSTRACT

Method of dispersing particulate matter, e.g., sludge, in water comprising adding thereto a copolymer, preferably methacrylic acid and acrylamide in a 1:1 mole ratio.

2 Claims, No Drawings

PROCESS FOR DISPERSING PARTICULATE MATERIAL IN AQUEOUS SYSTEMS

This is a continuation of application Ser. No. 263,317, filed May 13, 1981, now abandoned.

This invention relates to the prevention of the deposition of particulate material in aqueous systems, especially hard water systems.

The use of polycarboxylates and other low molecular weight polymers as dispersants for particulate material such as clay, silt, and ferric oxide, has been known for some time. While some of these materials are reasonably effective in soft-water systems, in hard water systems, for example those which contain at least 300 ppm calcium hardness, they are considerably less effective. A further problem is that if one increases the amount of polycarboxylate to counteract the hardness of the water this results in an imbalance between the polycarboxylate and phosphonate which is normally present to inhibit scale. In other words, the effectiveness of the scale inhibitor is reduced.

There is, therefore, a need for a material which will act as a dispersant in hard-water systems without adversely affecting scale inhibition. In this connection, a distinction should be drawn between preventing the deposition of particulate material and anti-precipitation. Thus materials can be added to aqueous systems to prevent precipitation of insoluble material on the container walls in order to prevent scale and the like. An anti-precipitant acts to prevent this precipitation. In contrast, the present invention is concerned with maintaining particulate material which has already formed from depositing without, however, affecting the effectiveness of phosphonates and the like which may be included in such systems to prevent scale.

It has surprisingly been found, according to the present invention, that certain water-soluble vinyl addition type copolymers are effective as dispersants for particulate material, especially in hard-water, without interfering with other additives included in the systems for other purposes. Accordingly, the present invention provides a method of treating water, in particular to prevent deposition of solid particulate material therein, which comprises adding thereto a copolymer as defined below.

The copolymers used in the present invention possess recurring units of the formula:

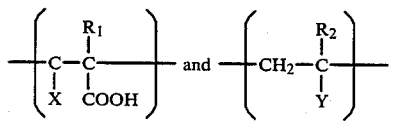

wherein $R_1$ and $R_2$ independently represent hydrogen or lower alkyl i.e. of 1 to 6 carbon atoms, X represents —COOH or hydrogen and Y represents a radical of the formula: —CONH$_2$, —COOCH$_2$CH$_2$OH, —COOCH$_2$CH(OH) —CH$_3$, —COOCH$_3$, —COOC$_2$H$_5$, —CN or —OH with the proviso that when Y is —CONH$_2$, X and $R_1$ are not both hydrogen.

These copolymers can be used either in the form of their free acids or in the form of salts such as alkali metal, ammonium or lower amine salts.

The mole ratio of the two specified recurring units is important and the copolymer must be such as to contain at least 5 mole percent of acid group-containing recurring units. Preferably, the mole ratio of the units is from 2:1 to 1:2 and optimum results are generally obtained with a mole ratio of about 1:1. In general, polymers containing less acid groups are more effective with higher calcium levels.

It will be appreciated that although the copolymers must contain recurring units of the two types specified above, it is also possible to use polymers which contain other types of recurring units as well. If these other recurring units contain acid groups then these should be taken into account in determining the mole ratio of acid group-containing units to the other units.

Preferred copolymers for use in the present invention include those derived from methacrylic and maleic acids, especially methacrylic acid and, in particular, copolymers of methacrylic acid and acrylamide, typically with a mole ratio of the two monomer units of about 1:1.

The molecular weight of the polymers is not particularly critical although it should not be too high since the polymer then tends to act as a flocculant. A general range for the molecular weight (weight average basis), for example that obtained using intrinsic viscosity measurements, is 500 to 10,000, the preferred range being from 1,000 to 5,000.

The copolymers used in the present invention can generally be prepared by the usual free-radical type polymerization conditions in aqueous media. Although it is possible to obtain certain acrylic acid copolymers by hydrolyzing polyacrylamide, it will be appreciated that the copolymers used in the present invention derived from methacrylic acid cannot be prepared by partial hydrolysis in this way because, of course, hydrolysis of acrylamide will only give acrylic acid and not methacrylic acid.

As indicated above, the present invention is particularly designed for use with water systems which contain significant calcium hardness although it can also be used for soft water. Thus the present invention would not normally be used for sea-water, especially sea-water in evaporators although such use is not completely excluded. Also, while the present invention is particularly designed for use with cooling water systems, it can also be used in boiler water systems and aqueous gas scrubbing systems. It should be emphasized that the copolymers used in the present invention have almost zero scale inhibition in cooling systems. A consequence of this is that the usual scale inhibitors and other additives which are conventionally employed in water treatment can be incorporated without the copolymers used adversely affecting their behaviour. In other words, the copolymers used in the present invention provide minimum interference with other additives.

The copolymers are typically added to the aqueous system in amounts of at least 0.1 ppm, for example 0.1 to 100 ppm. active polymer.

The following Examples further illustrate the present invention.

EXAMPLES 1 TO 3

The effect of various polymers in hard-water systems was tested by adding 1,000 ppm of the polymers to water containing calcium chloride (8,000 ppm. of Ca$^{2+}$, measured as calcium carbonate), at pH 7.0. The light transmission was then measured. Any precipitation increases the turbidity and hence lowers the light transmission. The smaller the reduction in light transmission the less is the effect of the polymer on precipitation.

TABLE 1

| Example Number | Additive | Light Transmission, % |
|---|---|---|
| 1 | Polymer 1 | 100 |
| 2 | Polymer 2 | 82 |
| 3 | Polymer 3 | 18 |

Polymer 1 = Copolymer of methacrylic acid/acrylamide, mole ratio 1:1, M. Wt. 5000
Polymer 2 = Polyacrylic acid, M. Wt. 2000
Polymer 3 = Polymethacrylic acid, M. Wt. 4,500

It can be seen that the copolymer of methacrylic acid and acrylamide, in contrast to polymethacrylic acid itself and polyacrylic acid has a very high tolerance towards very hard water.

EXAMPLES 4 TO 8

To illustrate the little or no effect which the polymers used in the present invention have on anti-precipitation, anti-precipitation tests were carried out on calcium carbonate or sulphate. These tests were conducted on water-containing calcium bicarbonate 1,600 ppm $Ca^{2+}$ measured as calcium carbonate at a temperature of 35° C. 10 ppm of polymer was added and the calcium ion remaining in solution after 24 hours was measured. The results obtained are shown in Table 2.

TABLE 2

| Example No. | Additive | $Ca^{2+}$ remaining in solution |
|---|---|---|
| 4 | Polymer 1 | 240 |
| 5 | Polymer 4 | 320 |
| 6 | Polymer 5 | 1350 |
| 7 | Polymer 2 | 1400 |
| 8 | Blank | 225 |

Polymer 4 = Copolymer of acrylic acid/acrylamide, mole ratio 1:1, M. Wt. 5000.
Polymer 5 = Polyacrylic acid, M. Wt. 5000.

These Examples clearly show that polymers 2 and 5 cause most of the calcium to remain in solution while polymer 1 has practically no effect since the calcium remaining in solution is practically the same as for the blank containing no added polymer. Polymer 4 is clearly in an intermediate position.

EXAMPLES 9 TO 12

These Examples illustrate the fact that the polymers used in the present invention do not interfere with the scale inhibiting properties of a conventional formulation for use in a cooling water system. The experiments were carried out on a laboratory scale simulated re-circulating cooling water rig in which the water contained 300 ppm $Ca^{2+}$. The heat exchange outlet temperature was 105° F. (40° C.). The results obtained after 48 hours are given in Table 3:

TABLE 3

| Example No. | Additive | $Ca^{2+}$ remaining in solution | Scale mgm |
|---|---|---|---|
| 9 | 1 ppm Polymer 6 0.5 ppm Phosphonate 1 | 280 | 0 |
| 10 | 1 ppm Polymer 6 0.5 ppm Phosphonate 1 0.5 ppm Polymer 1 | 290 | 0 |
| 11 | 1 ppm Polymer 6 0.5 ppm Phosphonate 1 2.5 ppm Polymer 1 | 282 | 0 |
| 12 | Blank | 90 | 200 |

Polymer 6 = Polyacrylic acid, M. Wt. 1000.
Phosphonate 1 = Nitrilo trismethylene phosphonic acid.

It can be seen that the addition of polymer 1 to the existing scale inhibiting compositions of polymer 6 and phosphonate 1 has virtually no effect on the scale inhibiting properties of this composition.

Although these tests were carried out using nitrilo trismethylene phosphonic acid, similar results have been obtained with other phosphonates which have been used for scale inhibiting purposes.

EXAMPLES 13 AND 14

These Examples illustrate the effectiveness of the polymers used in the present invention as dispersants in boiler water. It will be appreciated that in contrast to cooling water conditions, in a boiler the hardness is deliberately precipitated as the phosphate and this forms particulate material.

An experimental boiler was operated using phosphate with a boiler water concentration of about 10 times. The boiler pressure was 385±15 PSIG (27±1 kg/cm² gauge) and the feedwater contained the following:

Ca hardness: 22 ppm
Mg hardness: 8 ppm
Chloride: 40 ppm
Sulphate: 25 ppm
Silica: 2 ppm
Total dissolved solids: 300 ppm The results obtained with polymers 1 and 3 are shown below:

| Example No. | Additive (in feed) | Scale inhibition (hot surface) |
|---|---|---|
| 13 | Polymer 3, 3 ppm | 97.5% |
| 14 | Polymer 1, 2 ppm | 95.9% |

Hence Polymer 1 is an effective scale inhibitor under these conditions.

EXAMPLES 15 TO 17

Tests were carried out in order to assess the effectiveness of the polymers on dispersion. These were carried out using china clay. Efficiency was estimated by withdrawing the samples after a given time (2 hours and 4 hours) from a given depth below the surface in a static type dispersing test and measuring the light-transmission through the sample. The percent efficiency was calculated from the expression:

$$\frac{T_B - T_2}{T_B - T_O} \times 100$$

where
$T_B$ = final transmission of blank
$T_2$ = final transmission of additive
$T_O$ = Initial transmission The results obtained using 1,000 ppm china clay in 400 ppm $Ca^{2+}$ water at room temperature and a pH of 8.5 are shown in Table 5:

TABLE 5

| | | | % Efficiency | |
|---|---|---|---|---|
| Example No. | Additive | Dose, ppm | after 2 hr. | after 4 hr. |
| 15 | Polymer 3 | 5 | 10 | — |
| 16 | Polymer 1 | 5 | 87 | 80 |
| 17 | Polymer 4 | 5 | 86 | 70.7 |

EXAMPLES 18 TO 21

A similar dispersion test was carried out with iron oxide. The conditions were the same as in Examples 15 to 17 except that the suspension contained 6,000 ppm of ferric oxide ($Fe_2O_3$)/china clay in a 5:1 ratio with 300 ppm $Ca^{2+}$. The results obtained are shown in Table 6:

TABLE 6

| Example No. | Additive | Dose, ppm | % Efficiency |
| --- | --- | --- | --- |
| 18 | Polymer 1 | 5 | 82 |
| 19 | Polymer 5 | 5 | 62 |
| 20 | Polymer 7 | 5 | 74 |
| 21 | Polymer 4 | 5 | 72 |

Polymer 7 = Copolymer of methacrylic acid/2-acrylamido-2-methylpropane sulphonic acid in mole ratio 1:1, M. Wt. 5,000.

The results shown in Tables 5 and 6 illustrate the effectiveness of Polymer 1 as a dispersant under these conditions.

We claim:

1. Method of inhibiting deposition of clay, silt, and ferric oxide particulate material in an aqueous cooling system containing said particulate material and at least 300 ppm calcium hardness comprising adding to the system at least about 5 ppm of a copolymer of 25 to 50 mole percent methacrylic acid and 50 to 75 mole percent acrylamide, said copolymer having a molecular weight of about 5,000.

2. Method according to claim 1 in which the mole ratio of methacrylic acid to acrylamide is about 1:1.

* * * * *